July 14, 1925.
J. NULL
POULTRY FEEDER
Filed March 18, 1925
1,545,788
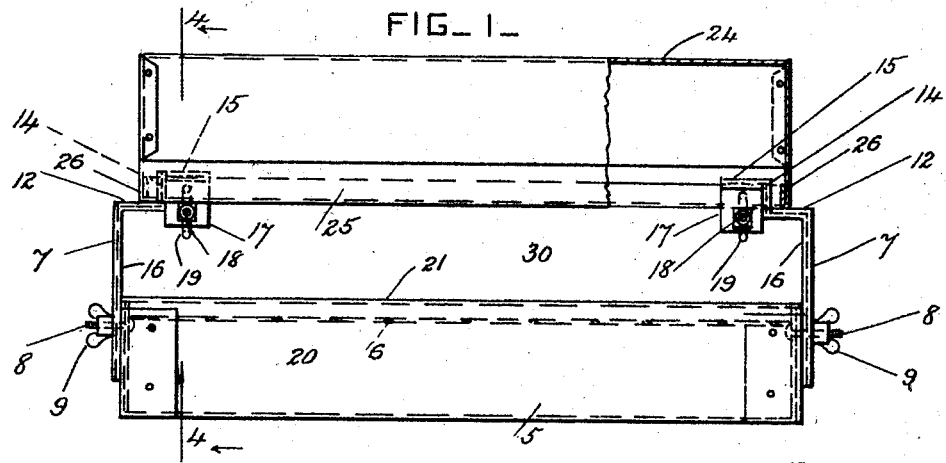
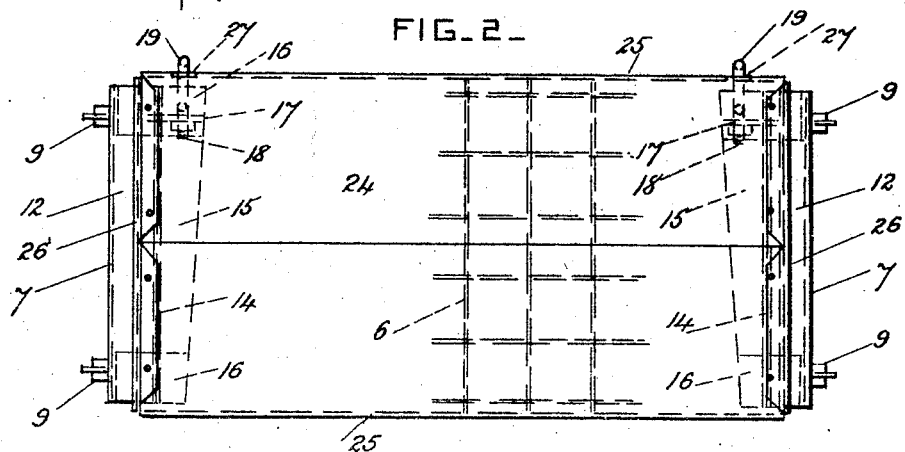
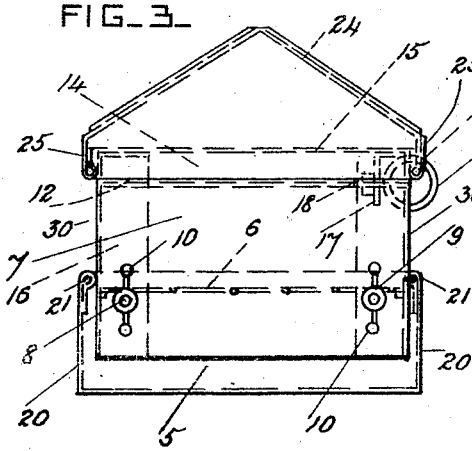
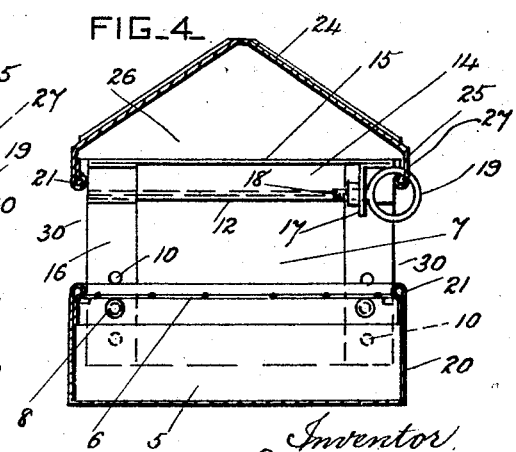
Inventor
Jesse Null
by Herbert W. Denner
Attorney.

Patented July 14, 1925.

1,545,788

UNITED STATES PATENT OFFICE.

JESSE NULL, OF ARCADIA, CALIFORNIA.

POULTRY FEEDER.

Application filed March 18, 1925. Serial No. 16,365.

*To all whom it may concern:*

Be it known that I, JESSE NULL, a citizen of the United States, residing at Arcadia, in the county of Los Angeles and State of California, have invented certain new and useful Improvements in Poultry Feeders, of which the following is a specification.

This invention relates to feeders for poultry provided with devices which prevent the birds from wasting the food; and it consists in the novel construction and combination of the parts hereinafter fully described and claimed.

In the drawings, Figure 1 is a front view of a poultry feeder constructed according to this invention with a portion of the cover shown broken away. Fig. 2 is a plan view of the same. Fig. 3 is an end view of the poultry feeder. Fig. 4 is a cross-section taken on the line 4—4 in Fig. 1.

A rectangular box of sheet metal 5 for the feed is provided, and a removable grating 6 of wire-work is supported horizontally above the feed in the box, so that the birds are less liable to toss the feed about in the box. A plate 7 is secured against each end of the feed box by bolts 8 and thumb-nuts 9, and a series of holes 10 for each bolt is provided in the plate 7 so that it can be secured to project at various distances above the feed box. Each end plate 7 has a horizontally projecting portion 12 at its top which overlaps the end of the feed box, and each portion 12 has a vertically projecting part 14 at its free end. Each part 14 has also a horizontally projecting member 15 at its top which stiffens it and which projects in the same direction as the portion 12.

The end portions 16 of each end plate are doubled over to increase the stiffness of the plate, and a lug 17 is formed on one end portion of the horizontal member 15. This lug projects downwardly and is arranged parallel to the sides of the box, and is provided with a hole for the shank of an eye-bolt 18 having its ring or eye 19 arranged under the member 15 and parallel to the end plate 7. The sides 20 of the box are doubled over at their tops to form beads 21, which stiffen the sides, and prevent the birds from injuring their necks in getting feed from the box.

The cover 24 is also formed of sheet metal, and is preferably angle-shaped in cross-section, to shed the rain, and it is provided with vertical sides 25 arranged vertically over the vertical sides 20 of the box, and also provided with stiffening beads which form blunt protective edges. The ends 26 of the cover rest on the lower horizontal portions 12 of the end plates 7. The cover is retained in place laterally by the ends of the parts 14 and 15, and is retained in place endwise by the vertical parts 14. One side 25 of the cover has two holes 27 which slide on the rings or eyes 19 of the eye-bolts so that the cover is loosely hinged to the end plates, and may be turned over clear of the box as often as it is necessary to place the feed in it.

The spaces 30 between the sides of the box and the sides of the cover are regulated, by changing the position of the end plates vertically, to adapt them to the size of the poultry for which the feeder is provided. The birds put their heads through the spaces 30, and get the food from below the wire grating. The spaces 30 are adjusted so as to enable the birds to feed freely, without throwing the food about or wasting it in any way, and they are made so narrow that the birds cannot get through them onto the top of the wire grating.

What I claim is:

1. In a poultry feeder, a feed box, end plates, means for securing the end plates to the ends of the feed box with their tops at a predetermined level above it, and a cover hinged to the said end plates and provided with sides arranged vertically over the sides of the feed box and forming with them spaces of predetermined height through which the birds put their heads to obtain their food.

2. A poultry feeder as set forth in claim 1, and having also rings supported by the said end plates and arranged parallel to them and over the feed box, and the said cover having holes in its rear side which are slidable over the said rings and forming with them the hinged connection of the cover.

3. A poultry feeder as set forth in claim 1, the said end plates being provided at their tops with horizontal portions which have upwardly projecting vertical portions at their free ends, said vertical portions also having horizontal members at their tops, and rings secured to said horizontal members near one end thereof and arranged parallel to the said end plates, the said cover being hinged on the said rings and positioned by the said vertical portions and horizontal members which project upwardly inside it.

In testimony whereof I have affixed my signature.

JESSE NULL.